United States Patent [19]

Tokumoto

[11] Patent Number: 5,256,270

[45] Date of Patent: Oct. 26, 1993

[54] ELECTROSTATIC SEPARATING APPARATUS

[76] Inventor: Toshiyuki Tokumoto, 16-204, Minami Sojijicho 7-ban, Takatsuki-shi, Osaka, Japan

[21] Appl. No.: 798,218

[22] Filed: Nov. 26, 1991

[30] Foreign Application Priority Data

Nov. 29, 1990 [JP]  Japan .................................. 2-339804

[51] Int. Cl.$^5$ ........................... B03C 5/02; C02F 1/46
[52] U.S. Cl. ...................................... 204/302; 204/186
[58] Field of Search ................ 204/186, 302, 304-308

[56] References Cited

U.S. PATENT DOCUMENTS

| | | | |
|---|---|---|---|
| 3,412,003 | 11/1968 | Tokumoto | 204/186 |
| 3,891,537 | 6/1975 | Tokumoto | 204/308 |
| 4,252,631 | 2/1981 | Houarongkura et al. | 204/302 |

FOREIGN PATENT DOCUMENTS

| | | |
|---|---|---|
| 40-15549 | 7/1965 | Japan . |
| 51-3941 | 2/1976 | Japan . |
| 51-3942 | 2/1976 | Japan . |
| 51-23742 | 7/1976 | Japan . |
| 59-189993 | 2/1985 | Japan . |
| 60-031810 | 6/1985 | Japan . |
| 1-22821 | 4/1989 | Japan . |

*Primary Examiner*—John Niebling
*Assistant Examiner*—William T. Leader
*Attorney, Agent, or Firm*—Morgan & Finnegan

[57] ABSTRACT

An electrostatic separating aparatus comprises a tank which contains an insulating solvent solution and has a feed inlet for the liquid to be treated at the bottom, and a pair of electrodes which is equipped in the solvent solution and between which a high direct current voltage is applied. The side wall of the tank is made to be a double wall to form a pocket between the inner wall and the outer wall, and the upper edge of the inner wall is formed above the upper surface of the solvent solution to overflow the floated impurities of an intermediate layer formed on the upper surface of the solvent solution from the upper edge of the inner wall to the pocket. The pair of electrodes is present one-sided in the tank inclined upward against horizontal plane at an angle of 25° to 40°. A main pocket is provided on the side wall of the tank at the side of the upper edge of the electrode. A porous rectifying plate is provided substantially horizontally above the electrodes but below the upper end of the inner wall constituting the main pocket. A blind baffle plate is provided inclined upward from the center of the tank to the upper part of said main pocket above said porous rectifying plate, and a porous plate is equipped substantially vertically to the upper part of said blind baffle plate. A discharge outlet of treated water is provided on the upper part of the opposite wall of the tank to the main pocket. A water rectifier is provided over the feed inlet for the liquid to be treated. A pipe for automatic discharge of the solvent is further equipped to the tank so that the solvent suction opening is placed lower than the horizontal position of the water rectifier in the tank to enable efficient removal of the solvent in almost pure condition.

2 Claims, 1 Drawing Sheet

ELECTROSTATIC SEPARATING APPARATUS

BACKGROUND OF THE INVENTION

This invention relates to improvements in an electrostatic separating apparatus by utilizing an induced electrostatic field in an electrically insulating solvent solution.

The separating apparatus for the treatment of sewage or waste liquid utilizing an induced electrostatic field in an electrically insulating solvent solution have been developed by the inventors and disclosed in Japanese Patent Publication No. 15549 of 1965, No. 3941 of 1976, No. 3942 of 1976, No. 23742 of 1976 and No. 22821 of 1989.

These apparatus comprises a tank containing an electrically insulating solvent solution and the tank in which an inlet for feeding the liquid to be treated and an outlet for discharging the treated liquid are provided has a discharge outlet for floated impurity above the upper surface of the solvent solution layer. Additionally, there are arranged, in the solvent solution in the tank, a pair of electrodes between which a high direct current voltage is applied. By this structure, the organic substances contained in the liquid to be treated introduced from the inlet for feeding the liquid are dissolved in the solvent solution by the action of an electrostatic field formed by the pair of electrodes and the floated impurity of the intermediate layer formed on the upper surface of the solvent solution layer is discharged from the discharge outlet for floated impurity and the treated water in the treated liquid layer formed on the upper surface of the intermediate layer is discharged from the outlet for treated liquid.

By using such conventional electrostatic separating apparatus, sewage or waste liquid has been treated in high efficiency and treated water containing low amount of impurity could be discharged. However, incorporation of fine particles of gum insoluble in both of the solvent and water and/or the solvent into the treated water cannot be avoided when the gas dissolved in the liquid to be treated is separated in the electrostatic field and floats. Thus, a secondary treatment is further required to discharge the treated water matching the waste water criteria in many cases. The regulation on the content of organic substance in waste water became more and more stringent recently.

The production and use of Freon solvent detrimental to global environment have been prohibited all over the world and the pollution of underground water with chlorinated solvents also faces to a crisis of global scale.

An object of the invention is to provide a compact electrostatic separating apparatus which can recover the solvent contained in the water polluted by such solvent to 90% or higher by the treatment of the polluted water and further which can remove almost completely the solvent and others remaining in the treated water.

SUMMARY OF THE INVENTION

According to the invention, the above problems are very efficiently solved by improving an electrostatic separating apparatus comprising a tank which contains an insulating solvent solution and has a feed inlet for the liquid to be treated at the bottom, and a pair of electrodes which are provided in the solvent solution and between which a high direct current voltage is applied, the side wall of the tank being made to be a double wall to form a pocket between the inner wall and the outer wall, and the upper edge of the inner wall being formed above the upper surface of the solvent solution to overflow the floated impurities of an intermediate layer formed on the upper surface of the solvent solution from the upper edge of the inner wall to the pocket, as follows:

the pair of electrodes are provided on one side of the tank inclined upward against horizontal plane at an angle of 25° to 40°.

a main pocket is provided on the side wall of the tank at the side of the upper edge of the electrode.

a porous rectifying plate is provided substantially horizontally above the electrodes but below the upper end of the inner wall constituting the main pocket.

a blind baffle plate is provided inclined upward from the center of the tank to the upper part of said main pocket above said porous rectifying plate, and a porous plate is equipped substantially vertically to the upper part of said blind baffle plate.

a discharge outlet for treated water is provided on the upper part of the opposite wall of the tank to the main pocket, a water rectifier is provided over the feed inlet for the liquid to be treated, and a pipe for automatic discharge of the solvent is further provided in the tank so that the solvent suction opening is placed lower than the horizontal position of the water rectifier in the tank to enable efficient removal of the solvent in almost pure condition.

Furthermore, it is preferred an electrically depositable porous adsorptive filler layer be provided in the aqueous layer between the blind baffle plate and the discharge outlet in the tank in a condition spaced to the solvent solution layer and so as to contact with the aqueous layer. By this arrangement, the residual charge in the treated water after electrostatic treatment can be continuously utilized to remove all solvent remaining in the treated water completely.

DETAILED DESCRIPTION OF THE INVENTION

In the invention, it is preferred to use a solvent satisfying the following conditions as the solvent for the separation.

(1) It is neither inflammable nor explosive.
(2) It has a permittivity of 2.0 to 7.0 (at 20° C.).
(3) It has a specific gravity of not less than 1.30 (at 20° C.).
(4) It had a KB value (a measure showing solubility of kauri gum) of not less than 90.
(5) It has a melting point of not higher than 0° C.

In the invention, a negative high direct current voltage of approximately 40 to 60 KV is applied between the electrodes provided in such a solvent layer. The distance between the electrodes is generally 2 to 3 mm per KV of the applied negative high direct current voltage for tetrachloroethylene (having a permittivity of 2.35 at 15° C.).

For example, in the case where underground water polluted by tetachloroethylene, etc. is to be clarified, even if the content of the contaminant, tetrachloroethylene, is 1% (10,000 ppm), the distance between the electrodes is set to 2.5 mm per KV and the water is treated in an electrostatic field to which a negative high direct current voltage of 60 KV is applied. By the treatment, the content of tetrachloroethylene remaining in the treated water becomes nearly 8 ppm and about 99.92% of tetrachloroethylene is recovered in the solvent layer.

Furthermore, all of the solvent layer is charged with a constant 60 KV applied between the electrodes and thus the moisture dissolved in the solvent layer is aggregated to form water drops and floated and separated successively together with water treated by static electricity.

The procedure ensures to give a good stable water quality with no incorporation of solvent substance again in the aqueous layer treated by electrostatic extraction.

By this procedure, the insulating function due to the solvent layer is not lowered and danger of hydrolysis to the solvent layer is eliminated. Thus, continuous long-term chemically stable usage can be assured.

The moisture in the recovered solvent is near 8 ppm and hence it is same as a fresh solvent and can be used again as it is.

Such advantages of the invention are obtained as follows. First, the structure of the electrostatic field of the invention is provided by a provision of an anode (equipped with electrode pieces) and a cathode (equipped with electrode pieces) having a defined inclination (inclined upward at an angle of 25° to 40° to the horizontal plane) to one side, left or right, from the center of the tank. However, this inclination of the electrodes is determined by the relationship between the treated water and the permittivity and specific gravity of the solvent used as the solvent layer. As the inclined electrodes are present on one side of the tank, the electrostatically treated water floats along the side where the electrodes are present in the tank (electrostatic vessel). Thus, the treated water floats through the solvent layer and strikes a porous rectifying plate present horizontally on the upper part of it and its floating acceleration is decreased and, as the result, the treated water is separated from the solvent floated together therewith with higher precision.

Then, the fine particle solid in the floating water shows turbulence in the upper aqueous layer. However, an inclined blind baffle plate is present on the upper part of the tank and hence the solid is dropped automatically in the sludge sedimentation chamber equipped to the outside of the tank, that is a main pocket. Also, by the inclined baffle plate, the aqueous layer portion separated from floated solid passes through the vertical porous plate portion in the upper part of the inclined baffle plate and is directed to the discharge water outlet facing it and flows efficiently into the purified water layer.

The continuous automatic discharge outlet for the recovered solvent is provided such that as the solvent inlet is set lower than the horizontal position of the water rectifier under the electrostatic layer. This is to maintain the moisture in the recovered solvent at a minimum.

Thus, in the invention, the liquid to be treated is treated electrostatically with a high efficiency and the impurities contained in it are dissolved in a solvent or separated from the liquid and the aqueous layer can be isolated in pure condition. However, such a purification of aqueous layer becomes more sure by providing an electrically depositable porous adsorptive filler layer in the aqueous layer. As the electrically depositable porous adsorptive filler layer, there can be effectively used, for example, active carbon, porous metal block, fine metal wire or the like which is filled in a chamber through which water can pass. A laminate of porous metal plate can be also effectively used.

In the invention, as to the aqueous layer, the apparatus is designed so that the charged water passed through the electrostatic field applied by a negative direct current with a high voltage of 40 to 60 KV directly forms the aqueous layer on the upper part of the solvent layer. The upper and lower liquids are directly contacted to always maintain the potential difference.

When this charged water passes horizontally to the opposite discharge outlet at a constant flow rate through the active carbon layer equipped in the aqueous layer, the adsorption effect due to the charge is doubled and the adsorption on active carbon is not lowered rapidly. By this effect, the amount (near 8 ppm) of the solvent remaining in the aqueous layer after said electrostatic treatment can be further decreased to 0.001 to 0.006 ppm by the use of an active carbon layer and the like to get completely nontoxic clear water from the exhaust outlet.

It is preferred the lower end of the electrically depositable porous adsorptive filler layer provided in the aqueous layer be set at a defined distance from the lower solvent level to form a defined aqueous layer portion directly contacting to the lower solvent layer having always a defined charge. By this situation, it becomes possible to maintain the final charge of the aqueous layer portion passing continuously through the electrically depositable porous adsorptive filler layer in a defined direction.

In the present invention, as described above, to attain easily the complete treatment of water after electrostatic treatment, a defined discharge outlet is prepared opposite to the floating water to stabilize the constant horizontal flow of the floating water after passing through the electrostatic field and thus to completely aggregate electrostatically fine solid particles of about 0.5 to 1.0 microns as an intermediate layer in the liquid-contacting portion. It has a structure in which it falls continuously into the sludge sedimentation chamber automatically.

As the result, sludge is not incorporated in the electrically depositable porous adsorptive filler layer provided in the aqueous layer and hence clogging in the filled layer of active carbon, etc. does not occur.

Furthermore, in the invention, it is also possible to combine a method in which a forced ventilation is carried out from the bottom of the filler layer such as active carbon to grow an aerobic bacterium on the surface of active carbon, etc. and the organic substance such as the solvent adsorbed on active carbon, etc. is decomposed by the bacterium in a long period to further extend life cycle of active carbon, etc.

In the apparatus of the invention, it is preferred a supplementary pocket similar to the main pocket is provided on the side walls of the tank where the main pocket is absent, and especially it is preferred that a supplementary pocket is provided having the height of the inner wall of which is the same as that of the main pocket on the two side surfaces where the discharge outlet is absent. The supplementary pocket may be provided separately or in connection with the main pocket. In any way, by the presence of these supplementary pocket, the sludge formed between the aqueous layer and the solvent layer can be automatically removed more completely.

It is preferred the upper edge of the inner walls of both the main pocket and the supplementary pocket are formed to V notch form.

BRIEF DESCRIPTION OF THE DRAWINGS

The invention will now be explained in more detail with reference to the accompanying drawings. In the drawings.

PREFERRED EMBODIMENTS OF THE INVENTION

Figure 1:
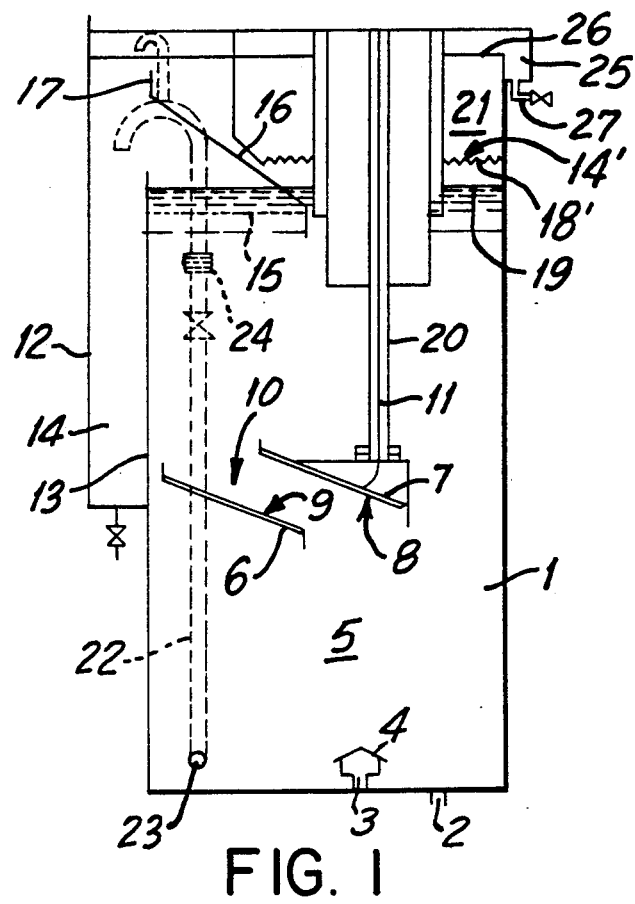
FIG. 1 shows a sectional view of one preferred form of an apparatus according to the invention.

An apparatus illustrated in FIG. 1 comprises a separating tank 1 which has at the bottom an inlet for a solvent solution (filtering material) 2 and an inlet 3 for the liquid to be treated. The inlet 3 is set at a proper height on the center of the bottom of the tank 1, has a proper length to the front and rear directions of the tank 1 and further has a number of holes on the outer periphery. A water rectifier 4 having a number of very small holes is further arranged on the upper part of the inlet 3.

In the solvent solution layer 5 in the tank 1, a pair of electrodes consisting of an anode 6 and a cathode 7 are arranged and are positioned to the left side of tank 1.

The cathode 7 connected to a high voltage electrode has a flat inclination 8 extending in the front and rear directions of the tank 1 and the inclination 8 is formed so that the left side is higher. The anode 6 is arranged to the outside of the cathode 7 so that its inner inclination 9 faces to the inclination 8 of the cathode 7 with a proper space so that it causes no spark discharge between the anode 6 and the cathode 7.

On the facing side of the cathode 7 and the anode 6, that is the inclinations 8 and 9, unique electrode pieces are provided though not shown in the drawing (See Japanese Patent Publication No. 23742 of 1976 or U.S. Pat. No. 3,891,537).

The anode 6 is fixed to the tank lid (not shown in the drawing) through an anode hanging member (not shown in the drawing). Thus, between the cathode 6 and the anode 7, a contacting zone 10 inclined to the upper left of tank 1 at a defined angle of 25° to 40° with respect to horizontal plane is formed extending in the front and rear directions.

The cathode 7 is connected to the high voltage cable 11 and supported mechanically by the supporting pipe 20 containing this cable 11.

The left side wall of the tank 1 is formed as a double wall and a main pocket 14 is formed between the outer wall 12 and the inner wall 13. The main pocket 14 is formed tapered so that the impurities accumulated in it can be easily removed.

On the upper part of the (right) side wall facing the inner wall 13 forming the main pocket 14 of the tank 1, a discharge outlet 27 for the aqueous layer 21 is formed. Between the inner wall 13 and the high voltage cable 11, a porous rectifying plate 15 is provided substantially horizontally near the upper end of the inner wall 13 so that it covers the upper opening between the cathode 7 and the anode 6.

Furthermore, over this porous rectifying plate 15, a blind baffle plate 16 is arranged upward inclined from the center of the tank 1 to the main pocket 14. A porous plate 17 is provided vertically to the upper part of the blind baffle plate 16. Each of the porous rectifying plate 15, the inclined blind baffle plate 16 formed to the upper part of it and the porous plate 17 is provided across the entire region between the front and rear walls across the tank 1 longitudinally.

The pipe 22 for automatically discharging the solvent is equipped so that its solvent inlet 23 is positioned lower than the horizontal position of the water rectifier 4 in the tank 1. Its solvent outlet is positioned higher than the upper end of the main pocket 14.

In the Example shown in the Drawing, a flexible tube 24 is provided for the pipe 22 for automatically discharging the solvent so that the height of the outlet may be adjusted.

Furthermore, in this Example, a supplementary pocket 14' is provided on the front and rear wall surfaces of the tank 1. The upper end 18' of the supplementary pocket 14' is formed to the same height as the upper end 18 of the main pocket 14 and both of them are of V notch shape.

On the upper part of the right wall facing the main pocket 14, a trough 25 is formed so that the water surface 26 of the supernatant liquid of the aqueous layer 21 after treatment overflows. A discharge outlet 27 is provided to this trough 25.

Now, the electrostatic treating method using this apparatus will be illustrated briefly.

First, an insulating or dielectric solvent having a higher specific gravity than water, for example perchloroethylene, is fed to the separation tank 1 through the feed inlet 2 and tank 1 is filled to a defined liquid level 19. Then, further tap water is fed to the upper layer to form an aqueous layer 21.

Then, negative direct current voltage is applied to the cathode 7. (The inner electrode may be made to be an anode and the outer electrode may be a cathode. In this case, the electrode 7 is an anode and a positive direct current voltage is applied to it.)

After the above preparations are completed, a liquid to be treated is fed to the tank 1 through the feed inlet 3. The liquid to be treated is preferably used in the form of an emulsion prepared by mixing with the solvent filled in the tank 1, that is perchloroethylene. The velocity of the liquid to be treated introduced to the feed inlet 3 is rapidly lowered and the liquid becomes small drops by the periphery of the feed inlet 3 where many small holes are provided. The liquid becomes even smaller drops at the upper portion of feed inlet 3 by the loose roof-type water rectifier 4 having a number of very small holes and then rises to the center of the cathode 7 by the difference of specific gravities.

The drops negatively charged by contacting to the inclination 8 of the cathode 7 are attracted to the anode 6 from the end of the electrode piece provided on the cathode 7 by the action of the electrostatic field at high velocity and the drops reaching to the inclination or slope of the anode 9 are now charged positively and again scattered to the cathode 7. During the movement of drops between both electrodes 6 and 7, the organic substances contained in the liquid to be treated are dissolved in the solvent solution 5 and impurity such as solids are also separated from water and rises in slow velocity and the floating impurities including solid forms the intermediate layer and water rises with slow velocity of the aqueous layer 21 successively in planar state. The water surface 26 pushed up overflows to the trough 25 and flows out of the discharge outlet 27.

In this apparatus, the electrodes are positioned on one side of the inner wall 13 where the main pocket 14 is present. Water and solid separated electrostatically rise along the inner wall 13 and strike the porous rectifying plate 15 positioned at the upper part to decrease the rising velocity. As the result they are separated from the solvent and float on the solvent solution 5 as a layer.

Then, the floating impurities in the floated water show turbulence in the upper aqueous layer. However, since a blind inclined baffle plate 16 is positioned over the porous rectifying plate 15, the impurities led to the upper part of the main pocket 14 automatically drop into the main pocket 14 and water separated from the impurities passes through the vertical porous plate 17 positioned at the upper portion and flows to the discharge outlet 27. As the main pocket 14 is formed tapered, the impurities are precipitated and concentrated rapidly and can be discharged from its lower discharge outlet. The impurities floated to the side where the porous rectifying plate 15 is absent, namely the solvent solution layer right to the tank 1, drop to the supplementary pocket 14'. The supplementary pocket 14' is formed tapered in the same manner as the main pocket 14 but the amount of impurities dropped there is small and hence it is formed shallower than the main pocket 14.

Thus, in the invention, the solvent, water and impurities are separated from each other with very high efficiency in one side of the tank 1. Furthermore, water is separated with higher precision by passing through the porous rectifying plate 15 and the blind inclined baffle plate 16 positioned above it. The water through the vertical porous plate 17 at the upper part of the tank 1 and is led to the discharge outlet 27 present facing it. Thus, water can be recovered from the liquid to be treated in a reusable condition.

Furthermore, in the invention, a solvent suction opening 23 for the automatic discharge pipe 22 of the solvent is provided lower than the water rectifier 4 arranged over the inlet 3 for feeding the liquid to be treated and at the lower part of the tank 1 (preferably lower than the electrode) and hence a solvent of high specific gravity can be recovered in nearly pure condition containing almost no moisture and can be used again as it is.

Figures 2, 3:
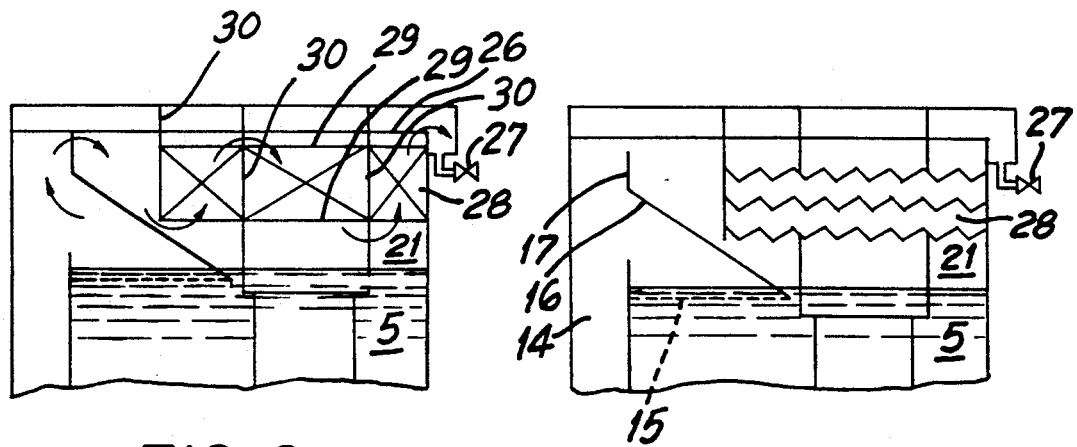
FIG. 2 and FIG. 3 show respectively a sectional view of the essential part of different apparatus according to the invention.

In the invention, to recover pure water, as shown in FIG. 2, it is preferred to provide an electrically depositable porous adsorptive filler layer 28 in the aqueous layer 21 between the blind baffle plate 16 and the discharge outlet 27.

In this Example, the porous adsorptive filler layer 28 is formed by a structure in which three cylinders filled with active carbon are arranged in parallel. The upper and lower ends of the cylinders are covered with porous metal plates 29 and the sides are sealed with blind metal plates 30 placed alternately up and down. Water separated electrostatically in the tank 1 passes through the porous adsorptive filler layer 28 following the arrow and is led to the discharge outlet 27.

To the lower part of the porous adsorptive filler layer 28, the aqueous layer 21 is still present between it and the solvent solution layer 5 and hence water passing through the porous adsorptive filler layer 28 moves always in charged condition. Thus, the solvent and impurity can be efficiently separated with active carbon (an electrically depositable porous adsorptive filler). Water thus treated can be recovered in a nontoxic condition containing not more than 0.001 ppm of the solvent.

Stainless steel wool and so on can be also used as the porous adsorbent in place of active carbon.

Also, as shown in FIG. 3, the porous adsorptive filler layer 28 may be formed by laminating corrugated porous metal plates 29.

As described above, the electrostatic separating apparatus according to the invention can be formed very compactly and accordingly, it can be efficiently used even in small enterprises such as a laundry shop. For example, used chlorinated solvent and the like can be efficiently treated and recovered.

Further, according to the present invention, both water and the solvent after treatment can be recovered in a reusable condition. Especially, in the treatment of water polluted by solvent and the like, 90% or more of the contained solvent can be recovered.

What is claimed is:

1. An electrostatic separating apparatus comprising a tank which contains an insulating solvent solution and has a feed inlet at the bottom thereof for the liquid to be treated, and a pair of opposed electrodes which are provided in said solvent solution, and means for applying a high direct current voltage between said electrodes, a side wall of said tank being a double wall forming a main pocket between an inner wall and outer wall, an upper edge of said inner wall being formed above the upper surface of said solvent solution to overflow floated impurities of an intermediate layer formed on the upper surface of the solvent solution from the upper edge of said inner wall to said main pocket, characterized in that:

said electrodes are present eccentrically in said tank and are positioned toward said inner wall, upward against a horizontal plane at an angle of 25° to 40°, a porous rectifying plate is provided substantially horizontally above said electrodes but below an upper edge of said inner wall, a blind baffle plate is provided inclined upward from the center of the tank to the upper part of said main pocket above said porous rectifying plate, and a porous plate is provided substantially vertically to the upper part of said blind baffle plate, a discharge outlet for treated water is provided on the upper part of a side wall of said tank opposite to said main pocket, a water rectifier is provided over said feed inlet or the liquid to be treated, and a pipe for automatic discharge of the solvent is provided in the tank such that a solvent suction opening at one end of said pipe is placed lower than the horizontal position of the water rectifier in said tank.

2. An electrostatic separating apparatus according to claim 1, in which an electrically conductive porous adsorptive filler layer is provided in an aqueous layer between said blind baffle plate and said discharge outlet in the tank spaced from said solvent solution layer so as to contact the aqueous layer.

* * * * *